(No Model.)
L. GATHMANN.
SHIP'S COMPASS.
No. 587,954. Patented Aug. 10, 1897.
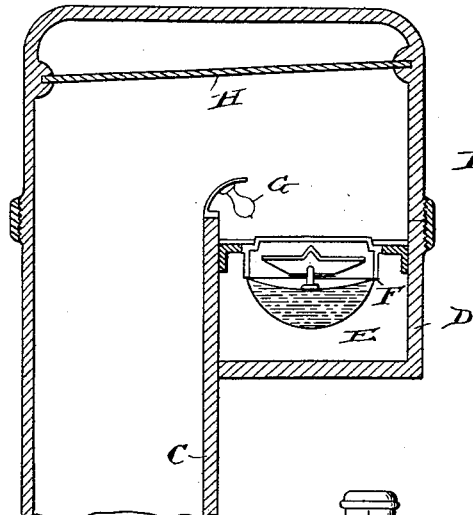
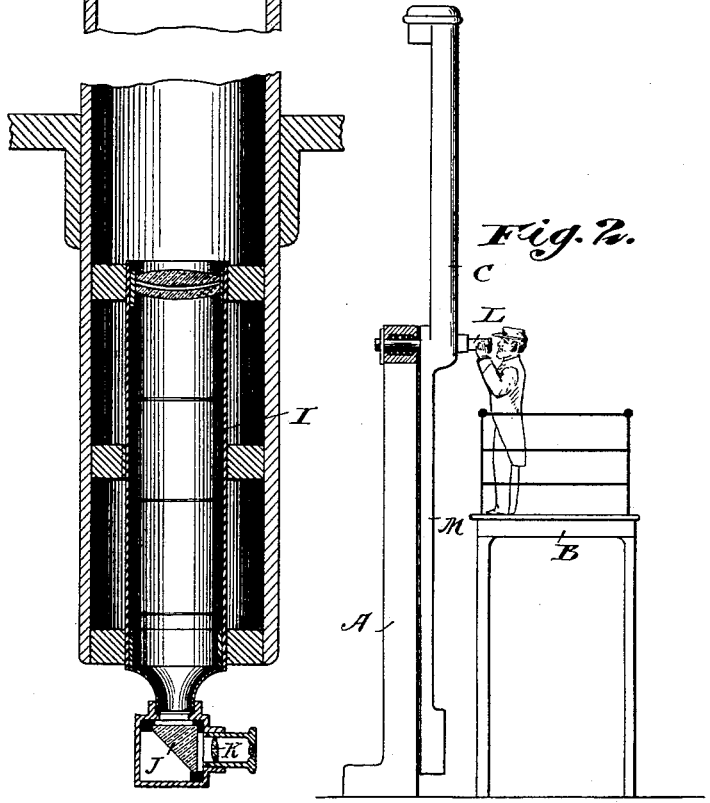
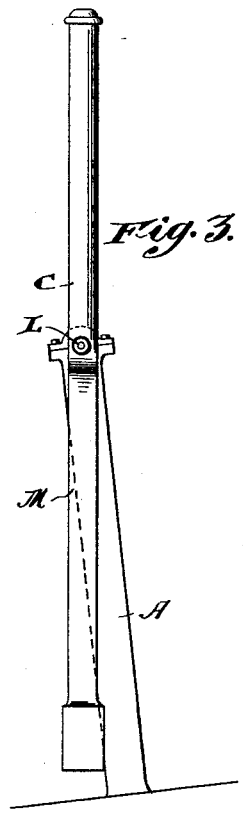
Witnesses,
Inventor;
Louis Gathmann
By Offield, Towle & Linthicum
Atty's

UNITED STATES PATENT OFFICE.

LOUIS GATHMANN, OF CHICAGO, ILLINOIS, ASSIGNOR TO GEORGE WHITMAN McMULLEN, OF PICTON, CANADA.

SHIP'S COMPASS.

SPECIFICATION forming part of Letters Patent No. 587,954, dated August 10, 1897.

Application filed March 17, 1896. Serial No. 583,539. (No model.)

*To all whom it may concern:*

Be it known that I, LOUIS GATHMANN, of Chicago, Illinois, have invented certain new and useful Improvements in Ships' Compasses, of which the following is a specification.

The object of my invention is to obtain from a compass the greatest possible efficiency and accuracy. With this end in view I mount the compasses so as to secure a relative freedom from local magnetic influences in such manner that they shall maintain the upright position regardless of the pitching or rolling of the vessel, whereby the compass is relieved from excessive motion and consequent rapid wear of its delicate parts, and, therefore, a steadier compass-card than has heretofore been obtained is assured.

In carrying out my invention I mount the compass in an elevated position, preferably in the upper end of a hollow tube or mast, and provide the tube in the preferred construction with an offset portion or lateral chamber in which the compass is located and with a reflector above the chamber and locate in the lower portion of the tube a telescope. I also arrange a light in proximity to the compass.

As a further improvement I pivotally mount this tube containing the telescope upon a suitable standard or support rigid with the vessel and counterbalance the weight of the tube, whereby to maintain it in an upright or perpendicular position, and therefore in proper alinement with the observation-point at all times, thus insuring the proper action of the compass and protecting it from injury which would result from excessive motion.

In the accompanying drawings, Figure 1 is a sectional view through the tube, telescope, and compass. Fig. 2 is a side elevation showing the compass-tube pivotally mounted; and Fig. 3 is a view at right angles to Fig. 1, showing the relative positions of the compass-tube and its support in a rolling or pitching movement of the vessel.

Referring to the drawings, let A represent a standard or support which may be rigidly mounted upon the deck of a vessel and of such height as will reach above the bridge B and preferably in proximity thereto. Pivotally mounted upon the support A is a compass-tube C, which is shown in section in Fig. 1 and has an offset portion D, forming a chamber E, to contain the compass F. In convenient proximity to the compass is the light G, and across the top of the tube is arranged the reflector H, by means of which the image is reflected through the tube C and is observed by the aid of the telescope I, arranged within the bore of the tube and provided with a prism J and an eyepiece K. The chief use of the telescope is to magnify the image, so as to render the compass-card easily read, and its form and construction may vary considerably. I prefer to mount the compass in the described relation to the tube and to employ in connection therewith the light and reflector, as thereby a compass of known construction may be employed without substantial change, and the light and reflecting means afford facilities for reading the compass at all times of the day or night.

As shown in Figs. 2 and 3, the compass-tube has a trunnion or journal L mounted in the upper portion of the standard A, and the lower end of the tube has a weighted extension M, which tends to preserve the tube in a perpendicular position at all times. In Fig. 3 the standard or post A is shown inclining from the vertical—as, for example, where the ship rolls—and as the chief movements to be provided against are the side movements I have shown the tube mounted to rock in one direction only, but obviously the pivot L may be a ball or universal joint, so as to permit the compass-tube to maintain a vertical position notwithstanding the rolling, pitching, or plunging of the vessel. The tube C should be of such length as to carry the compass in an elevated position, where it will be out of the magnetic influence of the masses of iron at or below the dock, and my improved compass mounted as described may be employed upon all classes of vessels.

In some instances the telescope may be dispensed with—as, for example, upon wooden ships, where the magnetic influence of large masses of iron is absent. On such ships my swinging compass-support may be used, and the compass will be located in position to be observed by the officer on the bridge, while its pivot will be below the bridge. In such cases the compass-support need not be in the form of a tube, but may be a solid mast or support pivotally mounted, so as to maintain at all times a vertical position.

I claim—

1. The herein-described improvement in the mounting of ships' compasses, which comprises, in combination, a tube movable about a fixed point, a compass carried by said tube and means for forming the image of the compass at the fixed point.

2. The herein-described improvement in the mounting of ships' compasses, which comprises, in combination, a tube pivotally mounted upon a rigid support, a compass mounted out of the line of sight of said tube, means for reflecting the image of the compass along said line of sight, an eyepiece connected to said tube at its pivotal point, and means for deflecting the image from the line of sight of the tube through the eyepiece.

3. The herein-described improvement in mounting ships' compasses, comprising in combination a tube having a telescope located in the lower portion thereof, a lateral offset portion at its upper end forming a chamber, a compass mounted in said chamber and a reflector extending above the compass and the upper end of the tube, substantially as described.

4. The herein-described improvement in mounting ships' compasses, comprising in combination a tube having a telescope located in the lower portion thereof, a lateral offset portion at its upper end forming a chamber, a compass mounted in said chamber, a reflector extending above the compass and the upper end of the tube, and a light adjacent to the compass, substantially as described.

5. The herein-described improvement in mounting ships' compasses, comprising, in combination, a tube having a lateral offset portion forming a chamber, a compass mounted therein, a lamp arranged to light the compass, a reflector over the chamber and the end of the tube, and a shade between the lamp and said reflector.

LOUIS GATHMANN.

Witnesses:
C. C. LINTHICUM,
N. M. BOND.